United States Patent
Fukunishi et al.

(10) Patent No.: US 11,941,953 B2
(45) Date of Patent: Mar. 26, 2024

(54) CASH DEPOSITING SYSTEM AND CASH DEPOSITING METHOD

(71) Applicant: Glory Ltd., Himeji (JP)

(72) Inventors: Yuta Fukunishi, Himeji (JP); Toru Fujino, Himeji (JP); Kisho Yanase, Himeji (JP); Minoru Higashiyama, Himeji (JP)

(73) Assignee: GLORY LTD., Himeji (JP)

( * ) Notice: Subject to any disclaimer, the term of this patent is extended or adjusted under 35 U.S.C. 154(b) by 0 days.

(21) Appl. No.: 17/939,967

(22) Filed: Sep. 8, 2022

(65) Prior Publication Data
US 2023/0074409 A1    Mar. 9, 2023

(30) Foreign Application Priority Data
Sep. 9, 2021    (JP) .................. 2021-146687

(51) Int. Cl.
*G07F 19/00* (2006.01)
*G06Q 20/10* (2012.01)
*G06Q 20/32* (2012.01)

(52) U.S. Cl.
CPC ....... *G07F 19/202* (2013.01); *G06Q 20/1085* (2013.01); *G06Q 20/3274* (2013.01)

(58) Field of Classification Search
CPC ........ G06F 19/202; G06F 19/20; G06F 19/00; G06F 19/201; G06Q 20/1085; G06Q 20/3274
USPC ...... 235/379, 375, 383; 705/43, 39; 382/135
See application file for complete search history.

(56) References Cited

U.S. PATENT DOCUMENTS

| | | | |
|---|---|---|---|
| 8,556,166 B1 * | 10/2013 | Folk ................ | G07F 19/209 235/379 |
| 2002/0156734 A1 | 10/2002 | Yamamoto | |
| 2021/0027264 A1 | 1/2021 | Hou et al. | |
| 2021/0049581 A1 | 2/2021 | Phillips et al. | |

FOREIGN PATENT DOCUMENTS

| | | | |
|---|---|---|---|
| JP | 3819163 B2 * | 9/2006 | |
| JP | 2019-36169 A | 3/2019 | |

OTHER PUBLICATIONS

Extended European search report dated Feb. 3, 2023, in corresponding European patent Application No. 22194124.8, 7 pages.

\* cited by examiner

*Primary Examiner* — Edwyn Labaze
(74) *Attorney, Agent, or Firm* — XSENSUS LLP

(57) ABSTRACT

A cash depositing system for a user to deposit cash into a user's account via a store, is provided with: a cash handling apparatus that recognizes and counts cash deposited by the user at the store, and obtains an amount of the cash; and a management server that acquires the amount of the cash and account information of the user, and determines whether or not a fund equivalent to an account deposit amount to be deposited into the user's account can be obtained from the store to a management company. In case where the management company can obtain the fund from the store, the management server instruct an external device, which performs account handling for moving the fund between an account of the management company and the user's account, to perform the account handling.

11 Claims, 10 Drawing Sheets

FIG.8A

| TRANSFER SOURCE | TRANSFER DESTI-NATION | TOTAL AMOUNT | STORE | ACCOUNT | TRANSACTION DATE/TIME | AMOUNT | ··· |
|---|---|---|---|---|---|---|---|
| B001 (BANK X) | B002 (BANK Y) | 100··· (Pxy) | S0002 (STORE B) | 530··· | 2021··· | 10,000 | ··· |
| | | | S0004 | 570··· | 2021··· | 13,000 | ··· |
| | | | ⋮ | | | | |
| | B003 | 130··· | S0014 | 710··· | 2021··· | 10,000 | ··· |
| | | | ⋮ | | | | |
| ⋮ | | | | | | | |
| B002 (BANK Y) | B001 (BANK X) | 120··· (Pyx) | S0003 | 500··· | 2021··· | 10,000 | ··· |
| | | | ⋮ | | | | |
| | B003 | 110··· | S0016 | 700··· | 2021··· | 5,000 | ··· |
| | | | ⋮ | | | | |
| ⋮ | | | | | | | |

FIG.8B

| | | RECEPTION SIDE | |
|---|---|---|---|
| | | BANK X | BANK Y |
| TRANSFER SIDE | BANK X | — | Pxy |
| | BANK Y | Pyx | — |

WHEN Pxy=Pyx, TRANSFER IS NOT NECESSARY

WHEN Pxy>Pyx,
TRANSFER AMOUNT OF Pxy−Pyx
FROM ACCOUNT OF BANK X TO ACCOUNT OF BANK Y

WHEN Pxy<Pyx,
TRANSFER AMOUNT OF Pyx−Pxy
FROM ACCOUNT OF BANK Y TO ACCOUNT OF BANK X

FIG.9A
USER INFORMATION

| GROUP | BANK | ACCOUNT | USER | TRANSACTION DATE/TIME | STORE | ACCOUNT DEPOSIT AMOUNT | ... |
|---|---|---|---|---|---|---|---|
| G01 | B001 | 100... | U0001 | 2021... | S0004-1 | 50,000 | ... |
|  |  |  | U0002 | 2021... | S0004-2 | 70,000 | ... |
| ... |  |  |  |  |  |  |  |
| — | B001 | 500... | U0101 | 2021... | S0004-2 | 70,000 | ... |
| ... |  |  |  |  |  |  |  |

FIG.9B
SETTING INFORMATION

| BANK | COMMISSION RATE | STORE | STORE HANDLING FEE |
|---|---|---|---|
| B001 | 5% | S0001 | 100 |
|  |  | S0005 | 100 |
| B002 | 2.5% | S0002 | 100 |
| ... |  | ... |  |

FIG.9C
STORE INFORMATION

| GROUP | BANK | ACCOUNT | DEPOSIT | STORE | TRANSACTION RESTRAINT | TRANSACTION DATE/TIME | USER | DEPOSITED AMOUNT | HANDLING FEE |
|---|---|---|---|---|---|---|---|---|---|
| — | B001 | 110... | — | S0001 | NO RESTRAINT | 2021... | U0103 | 10,000 | 100 |
| — | B002 | 530... | — | S0002 | 1,000-JPY NOTES | 2021... | U0023 | 20,000 | 100 |
| — | B002 | 530... | 420... | S0003 | COINS | 2021... | U0051 | 8,000 | 100 |
| S004 | B001 | 530... | — | S0004-1 | 1,000-JPY NOTES AND COINS | 2021... | U0001 | 50,000 | 100 |
|  |  |  |  | S0004-2 | COINS | 2021... | U0001 | 70,000 | 100 |
| ... |  |  |  |  |  |  |  |  |  |

FIG.10

YOU CAN GET BENEFITS IF YOU DEPOSIT
1,000-JPY NOTES INTO YOUR ACCOUNT
AT COUNTER No.01!

DOUBLE POINTS FOR DEPOSIT OF
FIVE OR MORE 1,000-JPY NOTES!

CASH DEPOSITING SYSTEM AND CASH DEPOSITING METHOD

CROSS-REFERENCE TO RELATED APPLICATION

The present application claims priority to, Japanese patent application JP 2021-146687, filed Sep. 9, 2021, the entire contents of which being incorporated herein by reference.

TECHNICAL FIELD

The present disclosure relates to a cash depositing system and a cash depositing method for a user to deposit cash into an account at a financial institution.

BACKGROUND ART

Conventionally, a cash-out system has been used in a store. In the cash-out system, a customer in the store can receive cash withdrawn from an account of a financial institution without using an automated teller machine (ATM). Japanese Laid-Open Patent Publication No. 2019-36169 discloses a cash-out system which allows a user to receive, at a store entrusted by a bank, cash withdrawn from his/her account at the bank. When the user has received cash dispensed from an apparatus installed in the store, a total amount of the amount of cash and a handling fee is withdrawn from the bank account of the user.

SUMMARY

Conventionally, financial institutions have installed ATMs in many branches thereof and many retail stores in order to provide customers with services of cash withdrawal from accounts and cash depositing into accounts. In order to make cash depositing and withdrawal through ATMs possible, denominations and the quantity for each denomination of cash stored in each ATM need to be managed, which takes time and cost. In recent years, there has been an increasing trend of stores being capable of using the cash-out system. In the future, existing ATMs may be removed and the number of ATMs may be reduced. However, in the conventional cash-out system, the user can receive cash withdrawn from the account, but cannot deposit cash into the account.

The present disclosure is made in view of the problem, as well as other problems, of the conventional art, and the present disclosure addresses these issues, as discussed here, with a cash depositing system and a cash depositing method which allow a user, in a retail store, to deposit cash into an account at a financial institution.

A cash depositing system according to one aspect of the present disclosure is a system for a user to deposit cash into an account of the user via a store. The system includes: a cash handling apparatus configured to recognize and count cash that the user has deposited at the store, and obtain an amount of the cash; and a management server configured to acquire the amount of the cash and account information of the user, and determine whether or not a fund equivalent to an account deposit amount, which is an amount to be deposited into the account of the user, can be obtained from the store and moved to a management company. Based on a determination result that the fund can be obtained from the store to the management company, the management server instructs an external device, which performs account handling for moving the fund from an account of the management company to an account of the user, to perform the account handling. The objects, features, advantages and technical and industrial significance of this disclosure will be better understood by the following description and the accompanying drawings of the disclosure.

BRIEF DESCRIPTION OF THE DRAWINGS

FIGS. 8A and 8B illustrate handling in which the management server determines the content of transfer;

FIGS. 9A to 9C show examples of information managed by the management server; and FIG. 10 shows an example of benefit information announced to customers in a store.

DESCRIPTION OF EMBODIMENTS

Hereinafter, a cash depositing system and a cash depositing method according to the present disclosure will be described with reference to the accompanying drawings. A user of the cash depositing system of the present disclosure can deposit cash into his/her account at a financial institution when the user is in a store, without using an automatic teller machine (ATM). Examples of the store where the user can perform depositing of cash include retail stores such as a grocery store and a convenience store. Cash to be deposited by the user may be only banknotes, only coins, or both banknotes and coins.

An outline of handling performed in the cash depositing system is as follows. First, the user of the cash depositing system deposits, at a retail store, cash that the user wants to deposit into his/her account. This cash is deposited into a cash handling apparatus installed in the store. The cash handling apparatus recognizes and counts the cash to obtain a deposited amount. For example, an account deposit amount is obtained by subtracting, from the deposited amount, a handling fee to be paid by the user to the store, and a process of moving a fund equivalent to the account deposit amount from the store to a management company is performed. For example, the management company can obtain the fund equivalent to the account deposit amount when the store makes a money transfer form an account of the store to an account of the management company. For another example, the management company can obtain the fund equivalent to the account deposit amount from a source of funds that the management company receives in advance from the store. Subsequently, account handling for moving the fund equivalent to the account deposit amount from the account of the management company to the account of the user is performed. The account handling can be performed when a management server managed by the management company instructs a server of the financial institution to perform the account handling. As a result, the balance on the account of the user is increased by the account deposit amount. It leads to the same result as in the case where the user deposits the cash into the account by using an ATM.

The place where the user deposits cash is not limited to a store, and may be any facility such as a station. In this embodiment, the cash depositing system and the cash depositing method will be described for the case where the place is a retail store selling items to customers. Although, the financial institution and the account type are also not particularly limited, a bank account is adopted in this embodiment.

Figure 1:
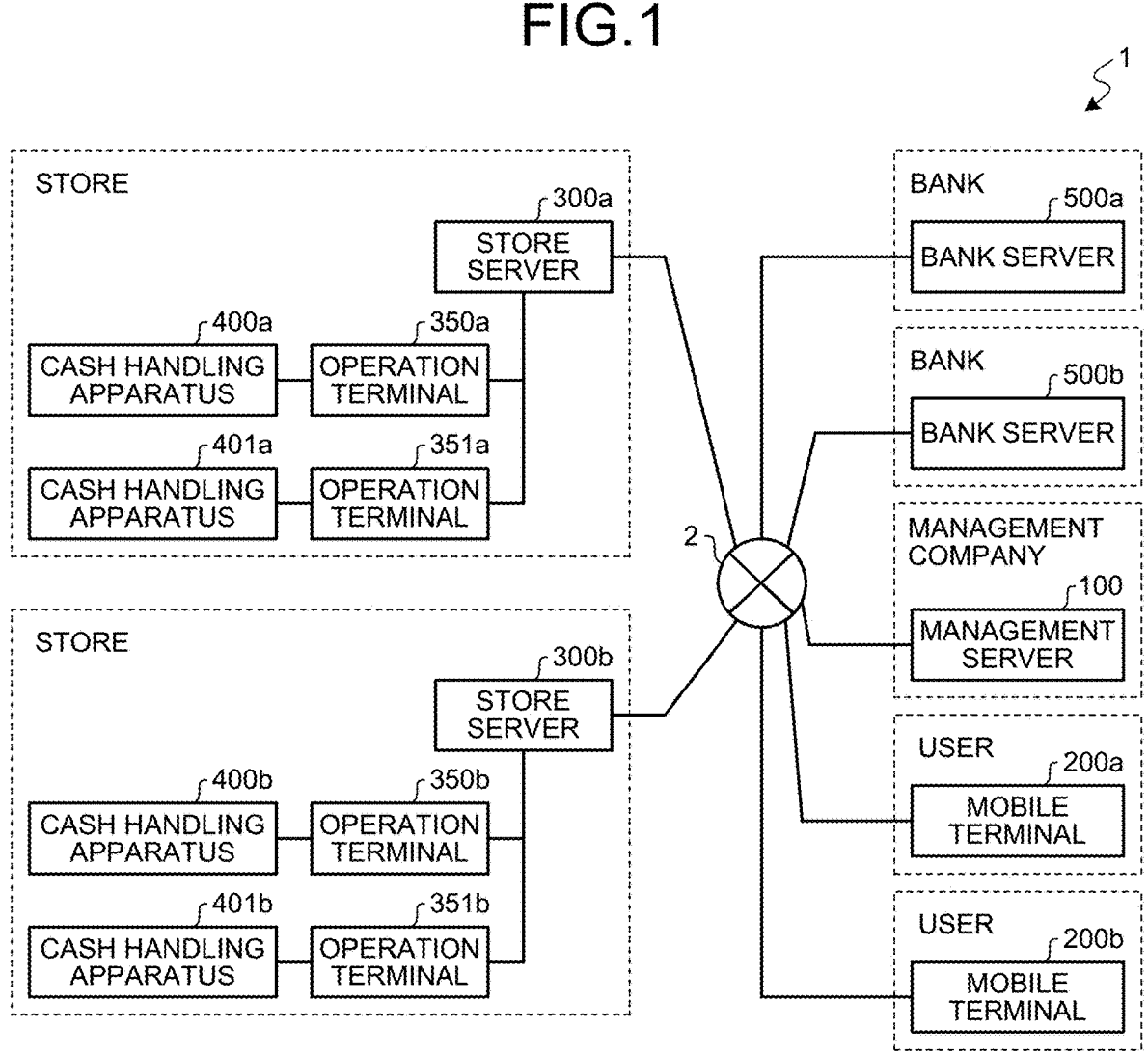
FIG. 1 is a block diagram showing an example of a configuration of a cash depositing system according to the present embodiment.

FIG. 1 is a block diagram showing an example of a configuration of a cash depositing system 1 according to the present embodiment. The cash depositing system 1 includes a management server 100, mobile terminals 200 (200a, 200b), store servers 300 (300a, 300b), operation terminals 350 (350a, 350b), 351 (351a, 351b), cash handling apparatuses 400 (400a, 400b), 401 (401a, 401b), and bank servers 500 (500a, 500b).

The management server 100, the mobile terminals 200, the store servers 300, and the bank servers 500 are communicable with each other via a network 2. The type of the network 2 is not particularly limited, and may be an Internet network or a dedicated network.

FIG. 1 shows two users, two stores, and two banks, but the numbers thereof are not particularly limited. The number of the mobile terminals 200, the store servers 300, and the bank servers 500 may be one, or three or more. In the example shown in FIG. 1, each store has two operation terminals and two cash handling apparatuses, but the numbers thereof are not particularly limited. In the present embodiment, the function and operation of the operation terminals 351 are substantially the same as those of the operation terminals 350. Likewise, the function and operation of the cash handling apparatuses 401 are substantially the same as those of the cash handling apparatuses 400. Therefore, with respect to the operation terminals 350, 351 and the cash handling apparatuses 400, 401, a description will be given for the operation terminal 350 and the cash handling apparatus 400.

The management server 100 is installed in a management company that manages the cash depositing system 1. The management company manages the cash depositing system 1 by operating the management server 100. For example, a computer device operable by using an operation terminal can be used as the management server 100. For another example, a computer device including an operation unit and a display unit can be used as the management server 100.

Each mobile terminal 200 is a portable communication terminal possessed by the user of the cash depositing system 1. The type of the communication terminal is not particularly limited. For example, a smartphone or a tablet computer is used as the mobile terminal 200. The user can perform a process for depositing cash into his/her bank account by using the mobile terminal 200.

The store server 300, the operation terminal 350, and the cash handling apparatus 400 are installed in the store. The store server 300 is a computer device including an operation unit and a display unit, for example. The store server 300 acquires information on the cash handling apparatus 400 from the operation terminal 350. The store server 300 can acquire and manage information on an inventory quantity of cash stored in the cash handling apparatus 400, i.e., information on denominations and the quantity for each denomination of the cash in the apparatus.

The operation terminal 350 includes an operation unit, a display unit, and a reading device for acquiring information from the mobile terminal 200 of the user. The operation terminal 350 is communicably connected to the cash handling apparatus 400. The operation terminal 350 manages the cash currently stored in the cash handling apparatus 400. A clerk controls the cash handling apparatus 400 by operating the operation terminal 350.

The cash handling apparatus 400 receives cash to be deposited, recognizes and counts the cash, and obtains a deposited amount of the cash. The cash handling apparatus 400 stores the recognized and counted cash, for each denomination, into storage units disposed inside the apparatus. The cash handling apparatus 400 may be able to dispense cash stored in the storage units, upon receiving information indicating the denomination and quantity of cash to be dispensed.

For example, a cash register, which is used for checkout at a checkout counter in the store when a customer purchases items, is used as the operation terminal 350, and a change machine, which is connected to the cash register and used for receiving money from the customer and dispensing change to be returned to the customer, is used as the cash handling apparatus 400.

The configurations of the operation terminal 350 and the cash handling apparatus 400 are not particularly limited as long as cash can be deposited into the cash handling apparatus 400 and a deposited amount can be obtained by recognizing and counting the deposited cash. The operation terminal 350 and the cash handling apparatus 400 may not necessarily be separated bodies, and may be integrated with each other. For example, a self-checkout machine used for checkout in the store may function as the operation terminal 350 and the cash handling apparatus 400. A semi-self-checkout machine used for checkout in the store may function as the operation terminal 350 and the cash handling apparatus 400. A vending machine used for selling items in the store may function as the operation terminal 350 and the cash handling apparatus 400. An automatic settlement machine used for payment of utility fees or the like in the store may function as the operation terminal 350 and the cash handling apparatus 400. A money changer, which is a machine that allows customers to change denominations of money in the store, may function as the operation terminal 350 and the cash handling apparatus 400. Since the cash handling apparatus 400 which receives, recognizes and counts the deposited cash, and outputs a deposited amount has conventionally been known, detailed description thereof is omitted.

The bank server 500 is installed in a bank. The bank server 500 performs account handling for moving funds between a plurality of bank accounts. The account handling includes a transfer process of moving a fund between bank accounts at the bank, and a transfer process of moving a fund from a bank account at the bank to a bank account at another bank.

Next, an outline of cash movement and account handling performed in the cash depositing system 1 will be described. The user deposits, at a store, cash that the user wants to deposit into his/her bank account. Then, the management company receives, from a bank account of the store to a bank account of the management company, a fund equivalent to an account deposit amount obtained by subtracting a handling fee to be paid by the user to the store, from the amount of the cash that the store has received from the user. The account handling for the case where the bank account of the user and the bank account of the store are at the same bank is different from the account handling for the case where these bank accounts are at different banks. In this embodiment, the "accounts at the same bank" include accounts for which no handling fee is charged on movement of a fund between these accounts, while the "accounts at different banks" include accounts for which a handling fee is charged on movement of a fund between these accounts.

Figure 2:
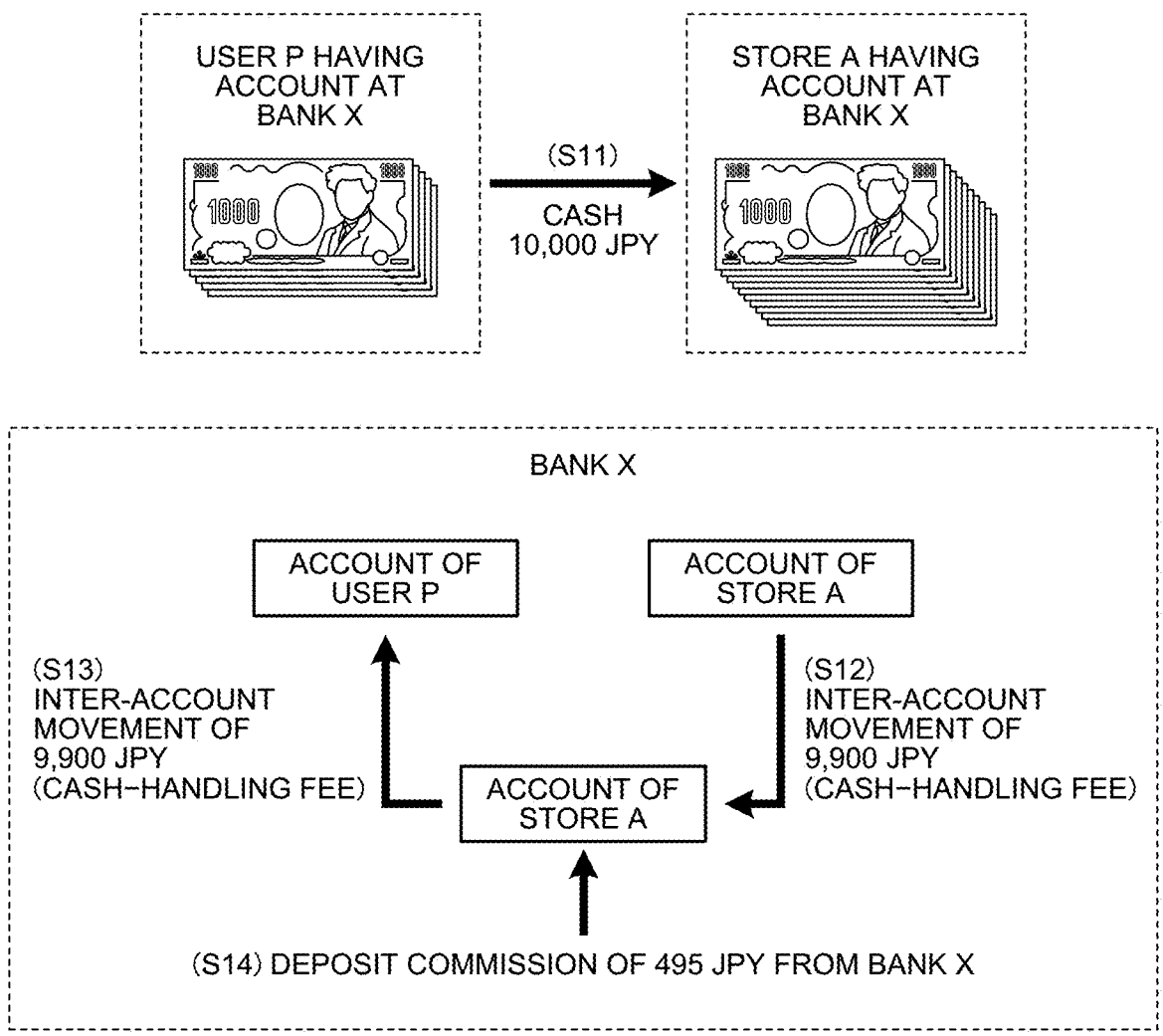
FIG. 2 is a schematic diagram showing cash movement and account handling in a case where a bank account of a user and a bank account of a store are at the same bank.

FIG. 2 is a schematic diagram showing cash movement and account handling in the case where the bank account of the user and the bank account of the store are at the same bank. A user P, who wants to deposit cash into his/her bank account at a bank X, deposits cash at a store A (step 311). The user P pays a handling fee to the store A. The amount of the handling fee is not particularly limited. The handling fee may be fixed, or may be changed according to the amount of cash that the user P deposits into the bank account. Hereinafter, the description continues on the assumption that the amount of cash to be deposited at the store A by the user P is 10,000 JPY, and a handling fee to be paid by the user P to the store A is 100 JPY out of the 10,000 JPY. That is, the user deposits 10,000 JPY at the store, pays the handling fee of 10,000 JPY to the store A, and 9,900 JPY is deposited into the bank account of the user.

In the bank X, a transfer of moving a fund equivalent to 9,900 JPY, which is obtained by subtracting the handling fee from the amount of cash that the user P has deposited at the store A, is performed from a bank account of the store A to the bank account of the management company (step S12). In addition, a transfer of moving the fund equivalent to 9,900 JPY from the bank account of the management company to the bank account of the user P is performed (step S13).

Using the cash depositing system 1 allows the bank X to receive, at the bank account of the user P, the cash that the user P has deposited at the store A. For example, even when no ATM is installed in the store A, the user P can deposit cash into his/her bank account, at the store A. Therefore, the bank X pays a predetermined commission to the management company that provides the cash depositing system 1 (step S14). The amount of the commission is not particularly limited, and may be fixed, or changed according to the amount that the user P has deposited into the account of the bank X. For example, the bank X deposits, as the commission, 5% of the amount that the user P has deposited into the bank account at the bank X, into the bank account of the management company. In the example shown in FIG. 2, 495 JPY corresponding to 5% of 9,900 JPY is deposited into the bank account of the management company at the bank X.

Figure 3:
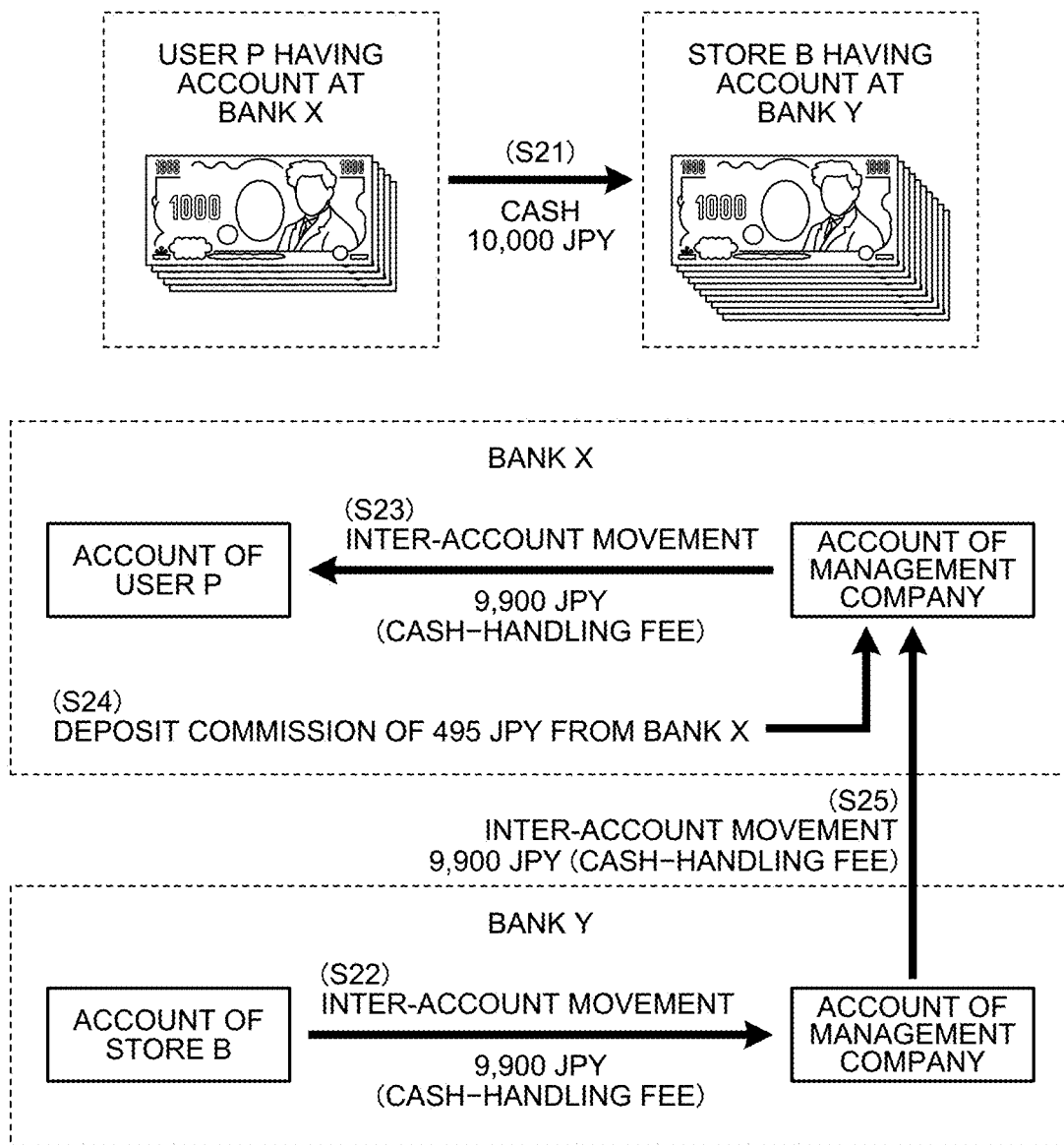
FIG. 3 is a schematic diagram showing cash movement and account handling in a case where the bank account of the user and the bank account of the store are at different banks.

FIG. 3 is a schematic diagram showing cash movement and account handling in the case where the bank account of the user and the bank account of the store are at different banks. A store B has a bank account at a bank Y which is different from the bank X at which the user P has a bank account. Therefore, account handling shown in in FIG. 3 is different from that shown in FIG. 2.

The user P, who wants to deposit cash into his/her bank account at the bank X, deposits cash at the store B (step 321), as in the case of FIG. 2. The user P pays a handling fee to the store B, as in the case of FIG. 2. The description continues on the assumption that the user deposits 10,000 JPY at the store, the handling fee to be paid by the user P to the store B is 100 JPY, and the amount to be deposited into the bank account of the user P is 9,900 JPY, as in FIG. 2.

The management company has bank accounts at both the bank X and the bank Y. First, in the bank Y, a transfer of moving a fund equivalent to 9,900 JPY is performed from a bank account of the store B to the bank account of the management company (step S22). Since this transfer is account handling between the bank accounts at the same bank Y, no transfer fee is charged.

In the bank X, a transfer of moving the fund equivalent to 9,900 JPY is performed from the bank account of the management company to the bank account of the user P (step S23). Since this transfer is account handling between the bank accounts at the same bank X, no transfer fee is charged. After the balance on the account of the user P has been increased by 9,900 JPY, a commission is deposited from the bank X into the bank account of the management company at the bank X, as in the case of FIG. 2 (step S24).

The management company having the bank accounts at both the bank X and the bank Y performs a transfer of moving the fund from the bank account at the bank Y to the bank account at bank X (step S25). As a result of this transfer, the fund of 9,900 JPY, which has been moved from the bank account of the store B to the bank account of the management company in the bank Y, is further moved to the bank account of the management company at the bank X from the bank Y. Since this transfer is account handling between different banks, the management company has to pay a transfer fee to the bank Y. The cash depositing system 1 can perform a process for suppressing the transfer fee to be paid by the management company, which will be described later.

Figure 4:
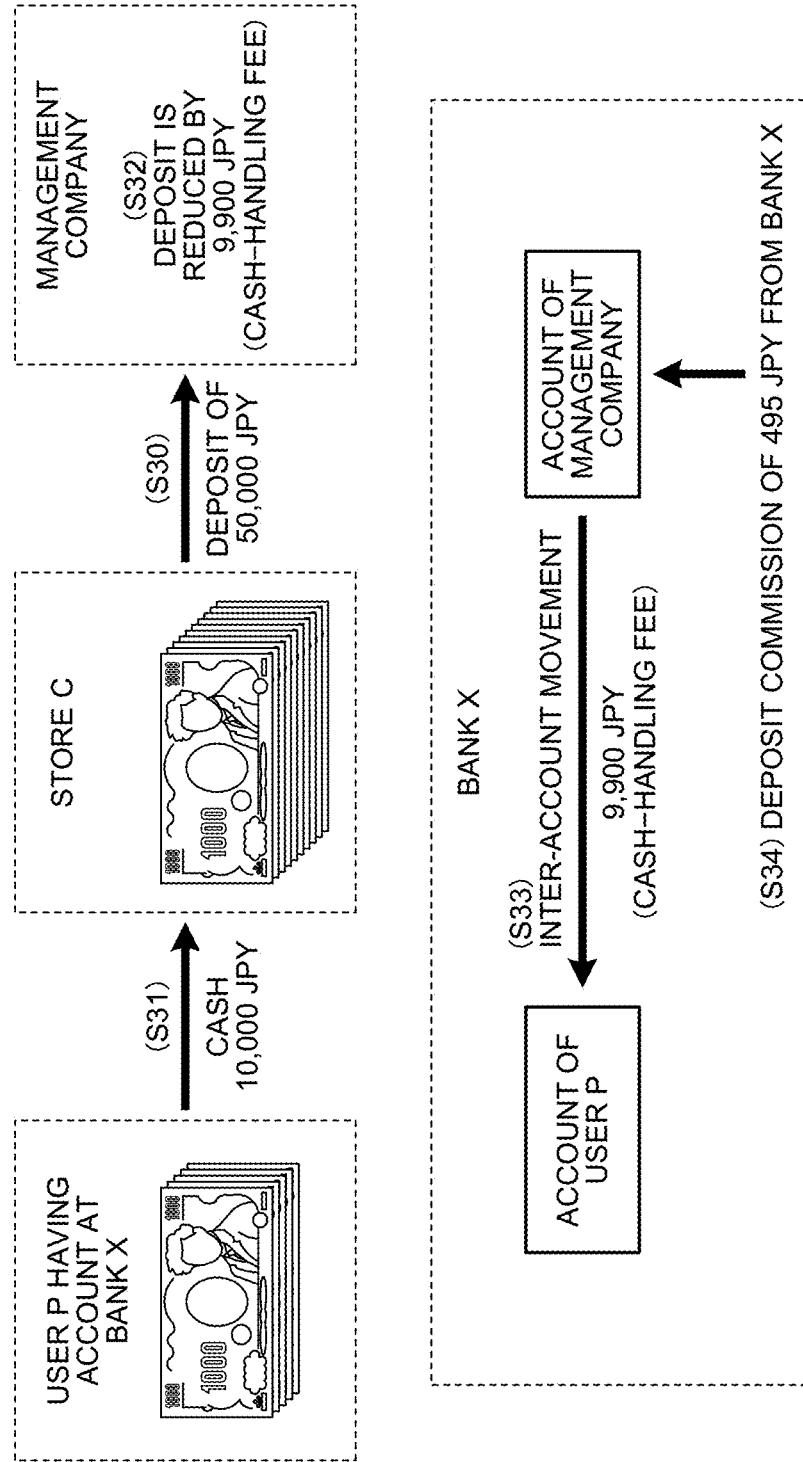
FIG. 4 is a schematic diagram showing cash movement and account handling in a case where the store leaves a deposit at a management company in advance.

FIG. 4 is a schematic diagram showing cash movement and account handling in a case where the store leaves a deposit at the management company in advance, as a source of funds. A store C leaves a deposit at the management company in advance in order to deal with the user who wants to deposit cash into his/her bank account at the store C (step S30). Although the amount of the deposit is not particularly limited, the description continues on the assumption that the store C has deposited 50,000 JPY to the management company, for example.

The user P, who wants to deposit cash into his/her bank account at the bank X, deposits cash at the store C (step S31) and pays a handling fee, as in the case of FIG. 2 and FIG. 3. The description continues on the assumption that the handling fee to be paid by the user P to the store C is 100 JPY, and the amount to be deposited into the bank account of the user P is 9,900 JPY, as in FIG. 2 or FIG. 3.

The management company receives a fund equivalent to 9,900 JPY from the store C by subtracting 9,900 JPY from the deposit of the store C (step S32). As a result, the amount of the deposit that the management company has received from the store C is reduced from 50,000 JPY to 40,100 JPY.

In the bank X, a transfer of moving a fund equivalent to 9,900 JPY is performed from the bank account of the management company at the bank X to the bank account of the user P (step S33). After the balance on the account of the user P is increased by 9,900 JPY, a commission is deposited from the bank X into the bank account of the management company at the bank X (step S34), as in the case of FIG. 2 and FIG. 3.

Thus, the user of the cash depositing system 1 can deposit cash into his/her bank account by depositing cash at the store and paying the handling fee to the store. For example, a user who has a large number of coins at hand can bring the coins into the store and deposit them into the bank account.

The store can obtain the handling fee by receiving in trust cash to be deposited into the bank account of the user (i.e., customer). Since the cash that the store has received in trust from the customer belongs to the store, the store can use the cash freely. For example, the store can use the cash as change in item transactions.

The bank can provide the user with a service of cash depositing into a bank account, without installing an ATM in the store, as in the case where an ATM is installed. The bank needs to pay a commission to the management company but does not need to perform installation, maintenance, and inspection of an ATM, and management of cash in the ATM. Therefore, the bank can reduce the total cost as compared to the case where an ATM is installed in each store.

Figure 5:
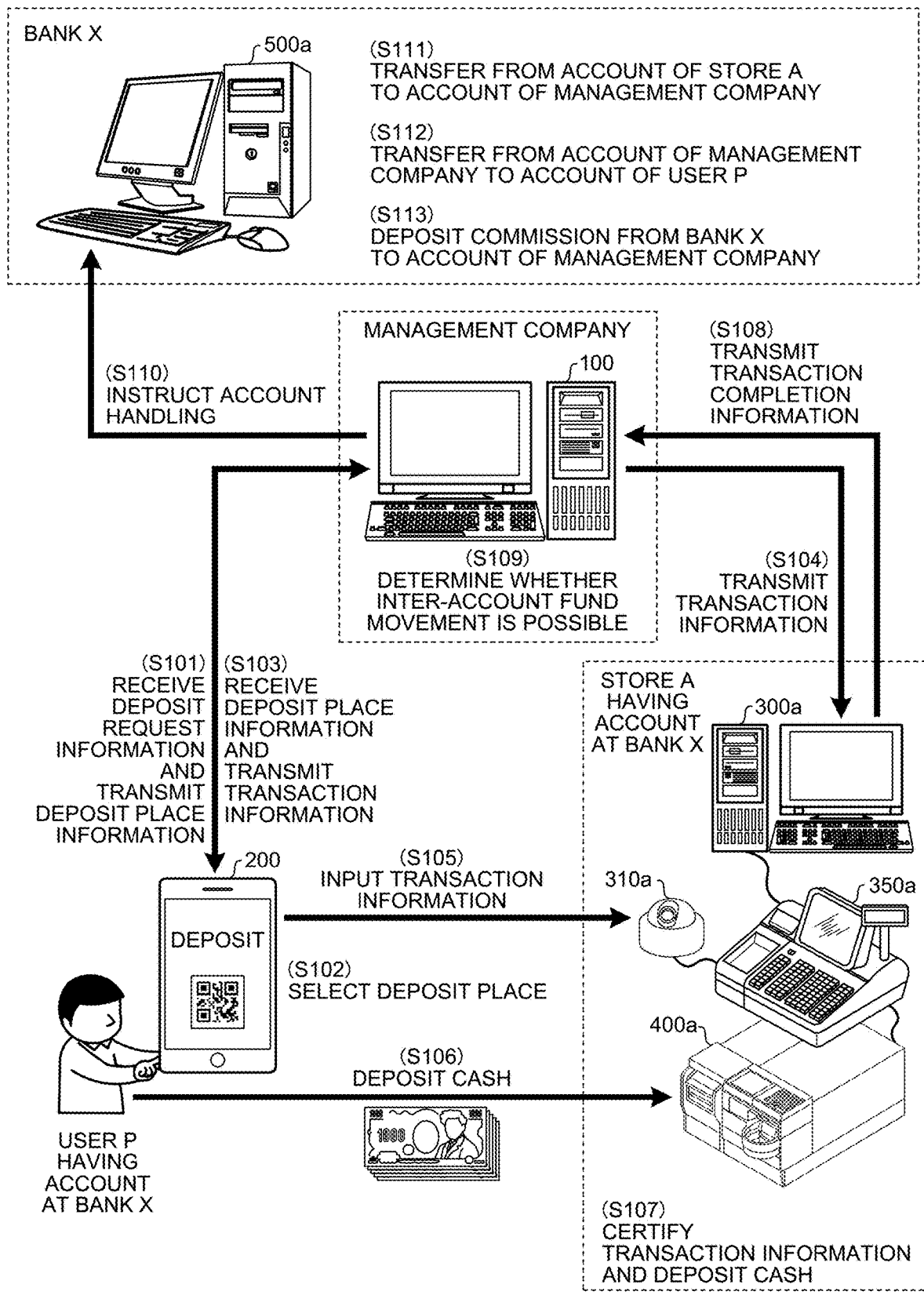
FIG. 5 is a schematic diagram showing a flow of processes in the case where the bank account of the user and the bank account of the store are at the same bank.

A method performed in the cash depositing system 1 to realize the processes shown in FIGS. 2 to 4 will be described with reference to FIGS. 5 to 7. FIG. 5 corresponds to FIG. 2, FIG. 6 corresponds to FIG. 3, and FIG. 7 corresponds to FIG. 4.

FIG. 5 is a schematic diagram showing a flow of processes in the case where the bank account of the user and the bank account of the store are at the same bank. The user P, who wants to deposit cash into his/her bank account at the bank X, starts a dedicated application on the mobile terminal 200, and performs an operation of requesting a cash deposit. In the application running on the mobile terminal 200, the user need not input the amount of cash that the user wants to deposit into a bank account of the user, and only needs to input information for specifying the bank account of the user P. For example, the user P inputs the account holder name and the account number. Alternatively, if the management server 100 has been managing account information of the user, such as the account holder name and the account number, in association with identification information of the user, the user P only needs to input the identification information.

The management server 100 receives, from the mobile terminal 200, deposit request information including the account information of the user P, and transmits, to the mobile terminal 200, information on stores at which the user P can deposit cash (step S101).

The management server 100 identifies the bank at which the user P has the bank account, based on the account information included in the deposit request information. The management server 100 searches for stores at which the user P can deposit cash, from among a plurality of stores using the cash depositing system 1. For example, the management server 100 internally manages information on stores that can receive cash to be deposited into the bank account of the user, and searches for stores, based on this information.

Alternatively, the management server 100 searches for stores by inquiring of the store server 300 of each store, about whether or not the store can receive cash to be deposited into the bank account of the user. For example, the store server 300a determines whether or not to receive cash from the user, based on whether the store is open and/or whether the store is crowded, and notifies the management server 100 of the determination result. Determination about whether or not to receive cash from the user can be automatically performed by the store server 300a, based on the status of use of the cash handling apparatus 400a (how crowded the store is). Alternatively, the determination can be manually performed by the clerk through an operation on the store server 300a or the operation terminal 350a. Examples of the clerk who performs the manual operation include a manager and a person in charge of the store. If a store has determined not to receive cash from the user, the management server 100, upon receiving notification of this determination result, eliminates this store from a list of stores capable of receiving cash from the user. Thus, the store can stop the service of cash reception through the automatic determination by the store server 300a or the manual operation by the clerk.

The management server 100 can acquire, from the mobile terminal 200 possessed by the user P, position information indicating the current position of the mobile terminal 200. The management server 100 creates a list of stores at which the user P can deposit cash, within a predetermined distance range centered around the current position of the user P. The management server 100 transmits the created list to the mobile terminal 200.

The user P checks the store list received from the management server 100, on the screen of the mobile terminal 200. By operating the mobile terminal 200, the user P selects the store A at which he/she will deposit cash, from among the stores on the store list (step S102).

The management server 100 receives the selection result of the user P from the mobile terminal 200, creates transaction information for the user P to deposit cash at the store A, and transmits the transaction information to the mobile terminal 200 (step S103). The management server 100 also transmits the transaction information to the store server 300a of the store A (step 3104). For example, the transaction information includes user identification information (user ID) for identifying the user P, and store identification information (store ID) for identifying the store A selected by the user P.

The user P goes to the store A selected with the mobile terminal 200. The mobile terminal 200 generates a graphic code in which the transaction information received from the management server 100 is encoded. The mobile terminal 200 displays the generated graphic code on the screen. Although the type of the graphic code is not particularly limited, the description continues hereinafter on the assumption that the graphic code is a OR code (registered trademark).

A camera 310a is connected to the operation terminal 350a of the store A. The camera 310a functions as a reading device through which the operation terminal 350a receives information from the mobile terminal 200. The user P causes the camera 310a to read the QR code displayed on the screen of the mobile terminal 200 (step 3105).

The operation terminal 350a decodes the OR code read by the camera 310a to acquire the transaction information. Based on the information such as the user ID included in the transaction information, the operation terminal 350a acquires the corresponding transaction information from the store server 300a. The operation terminal 350a collates the transaction information obtained from the mobile terminal 200 with the transaction information that the store server 300a has received from the management server 100. When it is confirmed that the transaction information obtained from the mobile terminal 200 matches the transaction information received from the management server 100, the operation terminal 350a accepts depositing of cash from the user P at the cash handling apparatus 400a. That is, when it is confirmed that the management server 100 has received a cash deposit request to be performed at the store A and acquired the account information of the user P, from the user P, the operation terminal 350a accepts the depositing of cash from the user P.

Cash that the user P deposits at the store A is deposited into the cash handling apparatus 400a (step S106). For example, the clerk receives the cash from the user P, and deposits the cash into the cash handling apparatus 400a. Alternatively, the user P may deposit the cash by himself/ herself.

The cash handling apparatus 400a recognizes and counts the deposited cash, and obtains a deposited amount. The deposited amount obtained in the cash handling apparatus 400a is transmitted to the store server 300a via the operation terminal 350a. The store server 300a transmits completion information indicating completion of a deposit transaction, to the management server 100 (step S108). The completion information may include, for example, information for identifying: the user ID of the user P; the store ID of the store A; the amount deposited into the cash handling apparatus 400a; the amount of the handling fee to be subtracted from the deposited amount by the store; the date and time of deposit completion; and the like. The management server 100 manages transaction history based on the completion information, which will be described later in detail.

Upon receiving the completion information, the management server 100 determines whether or not a fund to be moved from the bank account of the management company to the bank account of the user P can be obtained from the bank account of the store A and moved to the bank account of the management company (step S109).

The management server 100 manages store information in which the store ID of each store is associated with the account information of the store. The management server 100 identifies the bank account of the store A, based on the store ID included in the completion information. The management server 100, which has identified the bank account of the store A, determines whether or not the fund to be moved from the bank account of the management company to the bank account of the user P can be moved from the bank account of the store A to the bank account of the management company.

For example, the management server 100 may determine that the fund can be moved, based on that the bank account of the store can be specified from the store information. For another example, the management server 100 may inquire of the bank server 500 about whether or not the balance on the bank account of the store is larger than the amount obtained by subtracting the handling fee from the amount deposited into the cash handling apparatus 400. In the store information, stores not requiring confirmation of account balance and stores requiring confirmation of account balance may be set in advance, and the management server 100 may make the above inquiry to the bank server 500 only for the stores requiring confirmation of account balance. A threshold of an amount for which confirmation of account balance is required may be set in advance, and the management server 100 may inquire of the bank server 500 about the balance on the account of the store only when the amount of the fund to be moved between accounts exceeds this threshold.

The management server 100, which has determined that fund movement from the bank account of the store A to the bank account of the management company is possible, instructs the bank server 500a of the bank X, at which the user P and the store A have the bank accounts, to perform account handling (step S110). If the determination result is that fund movement from the store A to the management company is not possible, the deposit transaction is cancelled.

The management server 100 transmits, to the bank server 500a, information to identify the bank account of the user P, the bank account of the store A, the bank account of the management company, and the amount of the fund to be moved between these accounts. The management server 100 transmits, to the bank server 500a, an amount obtained by subtracting the handling fee that the store A receives from the user P, from the amount of the cash deposited into the cash handling apparatus 400a of the store A, as the amount of the fund to be moved between the accounts, i.e., as the account deposit amount to be deposited into the bank account of the user P.

The bank server 500a of the bank X performs a transfer of moving the fund equivalent to the account deposit amount from the bank account of the store A to the bank account of the management company, based on the information received from the management server 100 (step S111). The bank server 500a performs a transfer of moving the fund equivalent to the account deposit amount from the bank account of the management company to the bank account of the user P (step S112). The bank server 500a deposits a commission to be paid by the bank X to the management company, into the bank account of the management company (step S113). Thus, the balance on the bank account of the user P is increased by the account deposit amount, i.e., the amount obtained by subtracting the handling fee from the amount deposited at the store A by the user P.

Figure 6:
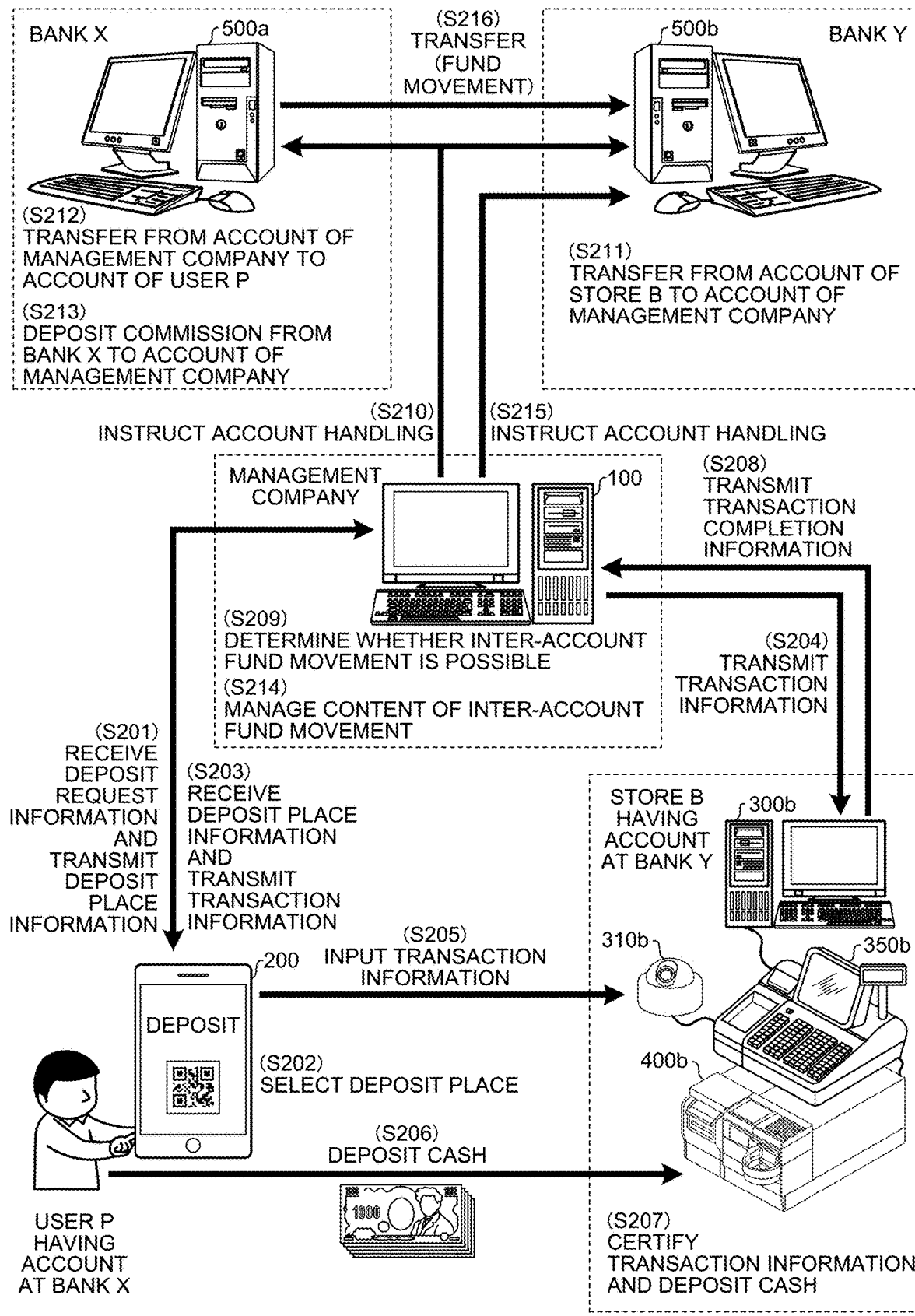
FIG. 6 is a schematic diagram showing a flow of processes in the case where the bank account of the user and the bank account of the store are at different banks.

FIG. 6 is a schematic diagram showing a flow of processes in the case where the bank account of the user and the bank account of the store are at different banks. The bank account of the user P is at the bank X, and the bank account of the store B is at the bank Y. Hereinafter, processes shown in FIG. 6 will be described mainly with respect to differences from the processes shown in FIG. 5.

The user P who visits the store B performs, with the mobile terminal 200, an operation for depositing cash, and thereafter, causes the operation terminal 350b to read a QR code displayed on the screen of the mobile terminal 200, via the camera 310b. The user P deposits, into the cash handling apparatus 400b, cash to be deposited into his/her bank account. Based on the amount deposited into the cash handling apparatus 400b, the management server 100 determines whether or not a fund to be moved from the bank account of the management company to the bank account of the user P can be obtained from the bank account of the store B and moved to the bank account of the management company, and starts the processes on account handling, based on the determination result. Since the processes in steps S201 to S209 are performed in the same way as those in steps S101 to 3109 shown in FIG. 5, repeated description is omitted.

Upon determining that fund movement from the bank account of the store B to the bank account of the management company is possible, the management server 100 instructs the bank server 500a of the bank X, at which the user P has the bank account, and the bank server 500b of the bank Y, at which the store B has the bank account, to perform account handling (step S210). If the determination result is that fund movement from the store B to the management company is not possible, the deposit transaction is cancelled.

The management server 100 transmits, to the bank server 500a of the bank X, information to identify the bank account of the user P, the bank account of the management company, and the amount to be moved between these accounts. Moreover, the management server 100 transmits, to the bank server 500b of the bank Y, information to identify the bank account of the store B, the bank account of the management company, and the amount to be moved between these accounts. The account deposit amount, which is obtained by subtracting the handling fee to be paid by the user P to the store B, from the amount of cash deposited into the cash handling apparatus 400b, is the amount to be transmitted to the bank server 500a and the bank server 500b.

Based on the information received from the management server 100, the bank server 500*b* of the bank Y performs a transfer of moving a fund equivalent to the account deposit amount from the bank account of the store B to the bank account of the management company (step S211).

Based on the information received from the management server 100, the bank server 500*a* of the bank X performs a transfer of moving the fund equivalent to the account deposit amount from the bank account of the management company to the bank account of the user P (step S212). The bank server 500*a* deposits a commission to be paid by the bank X to the management company, into the bank account of the management company (step S213). Thus, the balance on the bank account of the user P is increased by the account deposit amount that is the amount obtained by subtracting the handling fee from the amount deposited at the store B by the user P.

Based on the account handling performed in each bank, the management server 100 manages the content of movement of funds of the management company performed between the banks, i.e., the content of transfer performed between the banks (step S214). Based on this management, the management server 100 instructs the bank server 500*b* of the bank Y to perform transfer for the account deposit amount from the bank account of the management company at the bank Y to the bank account of the management company at the bank X (step S215). The management server 100 can sum up the account deposit amounts of a plurality of deposit transactions performed in each store, and perform fund movements between the banks by one transfer, which will be described later.

Upon receiving the instruction from the management server 100, the bank server 500*b* of the bank Y performs a transfer from the bank account of the management company at the bank Y to the bank account of the management company at the bank X (step S216). As a result, the fund equivalent to the amount having been moved from the bank account of the store B to the bank account of the management company in the bank Y, is further moved to the bank account of the bank X, whereby the balance on each of the bank accounts of the management company at the bank X and the bank Y is restored to the amount before the account handling in steps S211 to S213.

Figure 7:
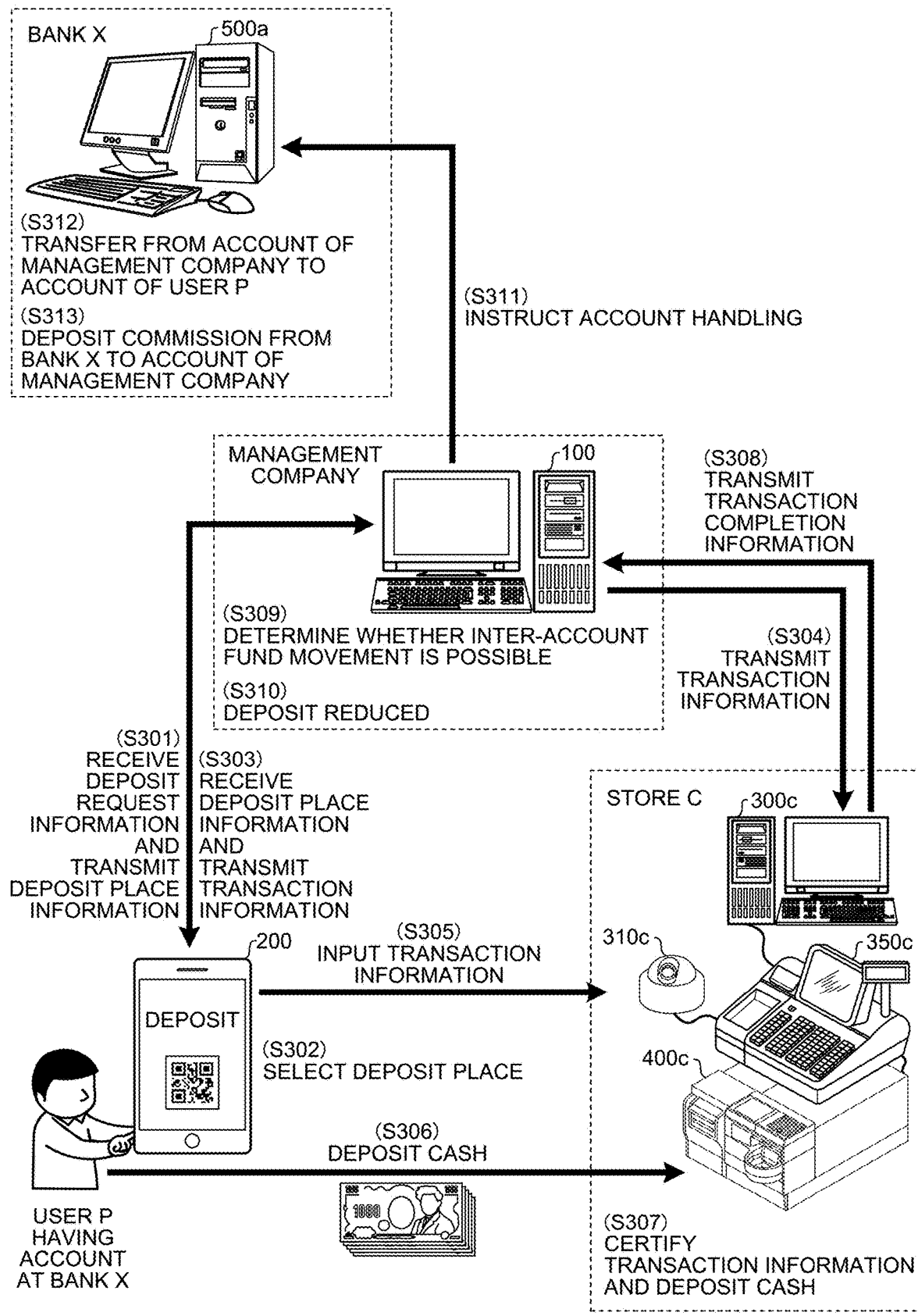
FIG. 7 is a schematic diagram showing a flow of processes in the case where the store leaves a deposit at the management company in advance.

FIG. 7 is a schematic diagram showing a flow of processes when a store leaves a deposit in a management company in advance. Since the processes shown in FIG. 7 is obtained by changing only a part of the processes shown in FIG. 6, FIG. 7 will be described mainly with respect to differences from FIG. 6.

The management server 100 manages the amount of a deposit that the management company has received in advance from the store C. After the processes in steps S301 to S308 corresponding to steps S201 to S208 in FIG. 6 have been performed, the management server 100 determines whether or not a fund to be moved from the bank account of the management company to the bank account of the user P can be obtained from the deposit of the store C (step S309). If the amount of the deposit of the store C is equal to or larger than the fund to be moved, i.e., the account deposit amount to be deposited into the bank account of the user P, the management server 100 determines that the fund can be moved. If the determination result is that the fund cannot be moved, the deposit transaction is cancelled.

The management server 100 moves the fund from the store C to the management company by decreasing the amount of the deposit of the store C by the account deposit amount (step S310). At this time, the management server 100 determines whether or not the deposit of the store C after the fund movement is equal to or smaller than a preset threshold, and when the deposit becomes equal to or smaller than the threshold, can notify the store C of the same. For example, the management server 100 transmits, to a terminal device used by a clerk of the store C, notification indicating the reduction in the amount of the deposit of the store C. Upon receiving the notification, the clerk of the store C checks the amount of the deposit of the store C and takes a countermeasure to increase the amount. Examples of the clerk who receives the notification include a manager and a person in charge of the store C.

Thereafter, the processes in steps S311 to S313 corresponding to steps S210, S212, and S213 in FIG. 6 are performed, whereby the fund equivalent to the account deposit amount is moved from the bank account of the management company to the bank account of the user P, and a commission is deposited from the bank X to the bank account of the management company. Since the fund movement between the store C and the management company is performed by using the deposit of the store C, the processes on the bank account of the store C are not performed. Therefore, in FIG. 7, the processes corresponding to step S211 and steps S214 to S216 shown in FIG. 6 are not performed.

In FIGS. 2 to 7, the store takes the handling fee from the user. However, the store may not necessarily take the handling fee. In this case, the above processes on the handling fee can be performed by regarding the handling fee is 0 (zero) JPY.

When a transfer is performed between different banks as shown in step S216 in FIG. 6, the management company has to pay a handling fee to the bank. If a transfer between different banks is performed each time a deposit transaction of passing/receiving cash between a user and a store is performed, the handling fee that the management company should pay to the banks becomes expensive. Therefore, the management server 100 can collectively handle a plurality of deposit transactions.

FIGS. 8A and BB are for explaining processes performed by the management server 100 to determine the content of transfer. FIG. 8A shows an example of information managed by the management server 100. FIG. 8B illustrates a method of determining the content of transfer to be performed between banks in order to move a fund between bank accounts of the management company at different banks.

As shown in FIG. 8A, the management server 100 manages information on transfers to be performed between banks. The management server 100 manages information shown in FIG. 8A, based on the completion information received in step S208 in FIG. 6.

As shown in FIG. 8A, for each bank to be a transfer source when transfer is performed between banks, a bank as a transfer destination and a total amount to be transferred to the bank are managed. The total amount is an amount obtained by summing up, for each transfer destination, the account deposit amounts moved from the bank accounts of stores to the bank account of the management company at deposit transactions.

The management server 100 performs a transfer between banks at a predetermined timing. For example, in order to move a fund equivalent to an amount under the item of "total amount" in FIG. 8A, the management server 100 instructs, twice a day, the bank server 500 of each bank under the item of "transfer source" to perform a transfer shown in step S215 in FIG. 6.

When instructing the bank server 500 to perform the transfer between banks, the management server 100 determines a transfer amount as shown in FIG. 8B, based on the information shown in FIG. 8A. In FIG. 8B, bank X, bank Y, and amounts Pxy and Pyx correspond to those parenthesized in FIG. 8A.

For example, as shown in FIG. 8B, when the amount Pxy to be transferred from the bank X to the bank Y is equal to the amount Pyx to be transferred from the bank Y to the bank X, the management server 100 determines not to perform a transfer. In this case, since fund movement between the banks is not necessary, the management server 100 does not make transfer instructions to the bank servers 500a, 500b.

When the amount Pxy is larger than the amount. Pyx, the management server 100 determines to transfer an amount obtained by subtracting Pyx from Pxy, from the bank X to the bank Y. In this case, a fund equivalent to the amount of (Pxy-Pyx) needs to be moved from the bank X to the bank Y. Therefore, the management server 100 makes a transfer instruction to the bank server 500a of the bank X.

When the amount Pyx is larger than the amount Pxy, the management server 100 determines to transfer an amount obtained by subtracting Pxy from Pyx, from the bank Y to the bank X. In this case, a fund equivalent to the amount of (Pyx-Pxy) needs to be moved from the bank Y to the bank X. Therefore, the management server 100 makes a transfer instruction to the bank server 500b of the bank Y.

While two banks are described as examples in FIG. 8B, the management server 100 manages information as shown in FIG. 8A for all the banks, and determines the amount of a fund to be moved between a plurality of banks. When fund movements are required between a plurality of banks, the management server 100 determines what amount of a fund will be finally moved from which bank to which bank as a result of the fund movements between the banks, and thereafter performs fund movement based on the determination result.

For example, in a case where a fund of 500,000 JPY needs to be moved from the bank X to the bank Y, a fund of 1,000,000 JPY needs to be moved from the bank Y to a bank Z, and a fund of 500,000 JPY needs to be moved from the bank Z to the bank X, it leads to a result in which a fund of 500,000 JPY is moved from the bank Y to the bank Z after these three fund movements. Therefore, the management server 100 performs one fund movement of 500,000 JPY from the bank Y to the bank Z instead of performing the three fund movements between the three banks X, Y and Z, thereby completing the fund movement between these three banks.

As described above, as for a plurality of deposit transactions in which users deposited cash at stores, the management server 100 sums up the amounts to be transferred between the banks and handles fund movements for the plurality of transactions by one transfer. Moreover, the management server 100 offsets the amount of a fund to be moved from a first bank to a second bank by the amount of a fund to be moved from the second bank to the first bank, and moves a fund equivalent to a resultant difference. That is, the management server 100 does not separately perform a transfer from the first bank to the second bank and a transfer from the second bank to the first bank, but offsets the transfer amounts to handle the transfer amounts by one transfer. This allow the management company to reduce the number of transfers and suppress the transfer fees. Moreover, burden on transfer handling in the banks can also be reduced.

The management server 100 manages information on users, information on stores, and information on deposit transactions in which users deposited cash at stores. FIGS. 9A to 9C show examples of these pieces of information managed by the management server 100. FIG. 9A shows an example of the user information. FIG. 9B shows an example of handling fee setting information. FIG. 9C shows an example of the store information.

As shown in FIG. 9A, the user information includes, registered therein, information on a bank account of each user, and information on deposit transactions that each user performed at stores. The management server 100, based on the user information, can identify the bank account of each user who performed a deposit transaction. Moreover, the management server 100, based on the user information, can identify date and time and a store at which each user deposited cash, and an account deposit amount to be deposited into the bank account of each user.

The user information may include, registered therein, a group associated with a plurality of users. FIG. 9A shows an example in which a plurality of users including a user whose user ID is "U0001" and a user whose user ID is "U0002" belongs to a group managed by a group ID of "G01", while a user whose user ID is "U0101" does not belong to any group.

For example, a plurality of users who belong to the same company are associated with each other by a group ID. The management server 100 can collectively handle the deposit transactions performed by the users belonging to the same group.

For example, a store D includes a first branch having a store ID of "50004-1" and a second branch having a store ID of "S0004-2". As shown in FIG. 9A, it is assumed that the account deposit amount is 50,000 JPY when the user whose user ID is "U0001" has performed a deposit transaction at the first branch of the store D having the store ID of "30004-1", and the account deposit amount is 70,000 JPY when the user whose user ID is "00002" has performed a deposit transaction at the second branch of the store D having the store ID of "50004-2". The management server 100 can collectively handle these two transactions at one time.

Specifically, instead of performing two times of handling, i.e., moving a fund of 50,000 JPY and moving a fund of 70,000 JPY from the store D to the management company, the management server 100 can move a fund of 120,000 JPY in total through one time of handling. Moreover, instead of instructing two times of account handling, i.e., moving a fund of 50,000 JPY and moving a fund of 70,000 JPY from the bank account of the management company to the bank account of the company having the group ID of "G01", the management server 100 can instruct the bank server 500 to move a fund of 120,000 JPY, which is a total amount of 50,000 JPY and 70,000 JPY, through one time of account handling between these two accounts.

That is, the management server 100 manages the account deposit amounts of the respective users in association with the bank accounts of the users, calculates a total amount of a plurality of account deposit amounts associated with the same bank account, and moves a fund equivalent to the total amount, thereby collectively handling a plurality of transactions. The fund movement for the plurality of transactions may include a fund movement of a total amount from the store to the management company and/or a fund movement of a total amount from the management company to the users.

When collectively handling a plurality of transactions, the management server 100 calculates a total amount of account deposit amounts, and performs a process of moving a fund of the total amount between the store and the management company and/or between the management company and the users, once a day at a predetermined time, for example. Alternatively, the management server 100 may calculate a total amount of account deposit amounts and perform a process of moving a fund of the total amount, once a month. The fund movement between the store and the management company and the fund movement between the management company and the users may not necessarily be performed at the same timing, and may be performed at different timings. The management server 100 can perform the fund moving process between the store and the management company at a timing set in advance for each store, and perform the fund moving process between the management company and the users at a timing set in advance for each user.

For example, as shown in FIG. 9A, the user information may include an item of "account handling time limit", and the management server 100 may collectively handle a plurality of transactions, based on the account handling time limit. The account handling time limit may be a time limit determined in advance for each group or each user, such as "morning of date of depositing process", "date of depositing process", "weekend", or "end of month". The management server 100 can perform the account handling for moving the fund between the bank account of the management company and the bank accounts of the users, based on the account handling time limit registered in the user information.

For another example, each user may designate an account handling time limit when performing a depositing process at a store. For example, the user can designate an account handling time limit by operating the mobile terminal 200 at step S103 in FIG. 5, step S203 in FIG. 6, or step S303 in FIG. 7. The management server 100 may manage the account handling time limit designated by the user, and perform an account handling for moving a fund between the bank account of the management company and the bank account of the user, based on the designated account handling time limit.

For example, if the time limit designated by a plurality of users who belong to the group ID of "G01" is "morning of date of depositing process", the management server 100 performs fund movement for the corresponding transactions performed by the users of the group "GJ1" at a predetermined time in the morning of the date of depositing process, e.g., a.m. 11:30. For another example, if the time limit designated by the plurality of users who belong to the group ID of "G01" is "end of month", the management server 100 collectively performs the fund movement for the corresponding transactions at the end of the month.

As shown in FIG. 9B, the management server 100 manages, for each bank, a commission rate of a commission that the management company obtains from the bank. Moreover, the management server 100 manages a handling fee ("store handling fee" in FIG. 9B) that each store obtains from the user. When the setting information includes the store handling fee, the management server 100 calculates an account deposit amount by subtracting the amount registered under the item of "store handling fee" from the deposited amount obtained in the cash handling apparatus 400 of each store.

The management server 100 manages the store information as shown in FIG. 9C. The store information includes, registered therein, information on the bank account of each store, and information on deposit transactions performed in each store. The management server 100, based on the store information, can identify the bank account of each store that performed a deposit transaction with the user. Moreover, the management server 100, based on the store information, can identify the content of a deposit transaction performed in each store.

In a case where the management company has received in advance a deposit from a store and uses this deposit as a source of funds to be moved from the store to the management company as shown in FIG. 4 and FIG. 7, the management server 100 manages the balance of the deposit under an item of "deposit" shown in FIG. 9C. When the amount of the deposit of a store becomes equal to or smaller than a predetermined threshold, the management server 100 eliminates this store from a list of stores at which the user can deposit cash and which are provided to the user in step S301 in FIG. 7.

As shown in FIG. 9C, the store information includes an item of "transaction restraint". Each store can register, under the item of "transaction restraint", information for limiting the denomination of cash that the store receives in trust from the user. For example, the clerk of each store can register the transaction restraint by operating the store server 300. Examples of the clerk who registers the transaction restraint include a manager and a person in charge of the store.

In the example shown in FIG. 9C, cash that a store having a store ID of "S0002" receives in trust from the user is limited to 1,000-JPY notes, and cash that stores having store IDs of "S0003" and "S0004-2" receive in trust from the user is limited to coins. In addition, cash that a store having a store ID of "S0004-1" receives in trust from the user is limited to 1,000-JPY notes and coins. Thus, each store can limit the denomination of cash that the store receives in trust from the user, to one or a plurality of denominations. In addition, the amount of cash that each store receives in trust from one user may be limited at the item of "transaction restraint". When the clerk has set an upper limit amount of cash, the cash handling apparatus 400 rejects cash exceeding the upper limit and returns the cash to the user, in the depositing process in which the user deposits cash at the store.

When the clerk has registered the transaction restraint by operating the store server 300, information registered under the item of "transaction restraint" is reflected in settings of the cash handling apparatus 400 in the store. Upon receiving information on the transaction restraint, the cash handling apparatus 400 performs a depositing process based on the transaction restraint. For example, when the denomination of cash that the store receives in trust from the user is limited to 1,000-JPY notes, the cash handling apparatus 400 recognizes the cash deposited by the user, rejects cash other than 1,000-JPY notes and discharges the rejected notes from the apparatus, and obtains a total amount of 1,000-JPY notes as a deposited amount. For another example, when the denomination of cash that the store receives in trust from the user is limited to coins, the cash handling apparatus 400 does not accept deposited banknotes but accepts only deposited coins, and obtains a total amount of the coins as a deposited amount.

The transaction restraint is applied only to the depositing process for cash that the user deposits into his/her bank account. For example, when the cash handling apparatus 400 is an apparatus used for checkout in an item transaction with the customer, a depositing process for checkout is performed irrespective of the transaction restraint. For example, when cash that is received at the store from the user who wants to deposit the cash into his/her bank account is limited to coins, the cash handling apparatus 400 does not receive deposited banknotes in the depositing process for cash to be deposited into the bank account, but receives deposited banknotes in the depositing process for checkout.

When the management server 100 transmits, to the mobile terminal 200, the list of stores at which the user can deposit cash, in step S101 in FIG. 5, step S201 in FIG. 6, or step S301 in FIG. 7, information indicating the transaction restraint may be transmitted together. The user checks the transaction restraints of the stores in the list, and selects a store at which he/she deposits cash.

The transaction restraint may be automatically set based on the inventory quantity of cash in the cash handling apparatus 400. In each store, cash received in trust from the user can be used as change in an item transaction with the customer. The clerk can set a threshold for each denomination of cash to be used as change, and cause the store server 300 to store the threshold. The store server 300 can limit cash to be received in trust from the user, to a denomination whose storage quantity in the cash handling apparatus 400 is equal to or smaller than the threshold.

The store server 300 manages, as inventory quantities, denominations and the quantity for each denomination of cash currently stored in each cash handling apparatus 400 in the store. The store server 300 specifies a denomination whose inventory quantity has become equal to or smaller than the threshold set by the clerk in advance. When the user performs a depositing process for the purpose of depositing cash into his/her bank account, the store server 300 can limit cash that can be deposited, to the specified denomination, i.e., the denomination whose inventory quantity in the apparatus has become equal to or smaller than the threshold. The store server 300 can register this limitation as a transaction restraint into the store information managed by the management server 100 as shown in FIG. 9C.

When there are a plurality of denominations whose inventory quantities have become equal to or smaller than the threshold, the store server 300 may determine priorities of the denominations. For example, the store server 300 gives a higher priority to a denomination whose inventory quantity in the cash handling apparatus 400 is smaller. Alternatively, for example, the store server 300 gives a higher priority to a denomination having a smaller ratio of storage quantity with respect to the threshold set for the denomination.

The clerk may check the inventory quantity of cash in the cash handling apparatus 400, and set the priorities of denominations by operating the store server 300. For example, when the clerk wants to increase, at top priority, 1,000-JPY notes in the cash handling apparatus 400, the clerk sets the highest priority for 1,000-JPY notes. For example, when the clerk wants to increase 100-JPY coins next to 1,000-JPY notes, the clerk sets the second highest priority for 100-JPY coins. In this case, the store server 300 can register, in the store information managed by the management server 100, a transaction restraint by which cash to be received in trust from the user is limited to 1,000-JPY notes and 100-JPY coins.

The store server 300 can announce information on the priorities to the customers in the store by using the display unit of the cash handling apparatus 400, the display unit of the operation terminal 350, or the like. The store server 300 can manage benefits according to the priorities, and announce the benefits to the customers.

The clerk can set in advance what kind of benefit is to be given in what situation, and cause the store server 300 to store the same as setting information. The clerk can set a benefit to be given to the user, according to the priorities. For example, points, which can be used for payment for an item when the user purchases the item in the store, are given as a benefit. When the priorities of denominations have been determined, the store server 300 announces the content of the benefit to the customers, based on the content of setting of the benefit prepared in advance.

The store server 300 may not necessarily determine the content of the benefit automatically based on the content of setting prepared in advance, and the clerk may manually determine the content of the benefit by operating the store server 300. For example, a manager or a person in charge of the store can check the details of the cash inventory in the cash handling apparatus 400 by operating the store server 300, and determine the content of the benefit to be given to a customer, according to the denomination of cash received from the customer.

FIG. 10 shows an example of the benefit information announced to the customers in the store. For example, on the display unit of the operation terminal. 350, the benefit information shown in FIG. 10 is displayed. The benefit information includes: information indicating the denomination of cash that the customers can deposit at the store; information indicating the place where the customers can receive the benefit; and information indicating the content of the benefit that the customers can get by depositing cash, and such information is displayed on the display unit.

If there are a plurality of checkout counters in the store, the store server 300 specifies a checkout counter where a cash handling apparatus 400 containing the smallest quantity of cash for change is placed. The store server 300 displays, on the display unit, information indicating the specified checkout counter. In the example shown in FIG. 10, since the cash handling apparatus 400 containing the smallest quantity of cash for change is placed on the checkout counter of "counter No. 01", information indicating this checkout counter is displayed. As for the information indicating the place in the store, the store server 300 may automatically detect the place, or the manager or the person in charge may manually designate the place by operating the store server 300.

In the example shown in FIG. 10, as for the denomination-based priority of cash, the highest priority is set for 1,000-JPY notes, and therefore, information that gives a customer an incentive to deposit 1,000-JPY notes is displayed. In addition, information indicating that a customer who has deposited a predetermined number or more of 1,000-JPY notes is given a higher benefit than the other customers, is displayed. When the clerk sets the benefit according to the denomination and quantity (amount) of cash that the store receives in trust, the store server 300 can announce the set content to the customer.

As described above, the information on the benefit that the user can get by depositing, at the store, cash to be deposited into his/her bank account, is displayed on the display unit of the operation terminal 350 or the cash handling apparatus 400, whereby the customers in the store are given an incentive to deposit cash at the store.

The information on the benefit may be displayed on a display unit installed in a place other than the checkout counter. The information on the benefit may be announced to the users of the cash depositing system 1 through e-mails, SNS (Social Networking Service), an application of the mobile terminal 200, a website operated by the store, etc.

For example, the store server 300 transmits, to the management server 100, information including: a denomination for which the store gives the benefit to the users; and the content of the benefit. For example, the management server 100 may transmit information that can be used for specifying the store and the information shown in FIG. 10, to the mobile terminals 200 of the users through e-mails. For another example, the management server 100 may perform announcement to the users by means of posting through an SNS, disclosure on a website, or notification through an application. Each user displays the announced information on the mobile terminal 200, and confirms the store, the denomination of cash for which the benefit can be obtained from the store, and the content of the benefit. The user, based on the information displayed on the mobile terminal 200, goes to the store and performs a deposit transaction of depositing, at the store, cash to be deposited into his/her bank account, whereby the user can obtain the benefit. The content of the benefit that the user receives is not limited to points that are available for payment for items that the user purchases in the store. For example, the benefit may be a coupon that is available in the store, or a small gift from the store.

In the present embodiment, the store server 300 manages the inventory quantity of cash in one cash handling apparatus 400. However, the store server 300 can manage the inventory quantities of cash in a plurality of cash handling apparatuses 400. For example, the store server 300 manages the inventory quantities of cash in a plurality of cash handling apparatuses 400 installed in the store, and determines a denomination of cash that the user can deposit into each cash handling apparatus 400 and the content of a benefit to be given to the user, according to the inventory quantity of cash stored in each cash handling apparatus 400. Meanwhile, for example, upon receiving an input of information on cash that the clerk is handling manually in the store, the store server 300 can determine a denomination of cash that the user can deposit at the store and the content of a benefit to be given to the user, based on the inventory quantities of cash in one or a plurality of cash handling apparatuses 400 and on the denomination and the amount of the cash that is being manually handled without using the cash handling apparatuses.

In the present embodiment, the amount of the commission to be paid from each bank to the management company is calculated by multiplying the amount that the user has deposited into his/her bank account by a predetermined commission rate. However, the commission determination method is not limited thereto. For example, the amount of the commission to be paid from each bank to the management company may be fixed, and the fixed amount of commission may be paid to the management company for each transaction. Furthermore, in the present embodiment, the amount of the handling fee to be paid by the user to the store is fixed. However, a handling fee rate may be set for each store, and the handling fee may be determined by multiplying the amount that the user has deposited at the store by the handling fee rate, as in the case of the commission described above. A bank may not necessarily pay the commission to the management company, and a store may not necessarily take the handling fee from the user. In this case, the cash depositing system 1 may perform the above-described processes, with the commission and the handling fee being 0 (zero).

The components of the cash depositing system 1 according to the present embodiment are conceptually functional components, and thus may not necessarily be physically limited thereto. For example, the cash handling apparatus 400 may implement a part or the entirety of the function and operation of the operation terminal 350. The operation terminal 350 may implement a part or the entirety of the function and operation of the store server 300. The store server 300 may implement a part or the entirety of the function and operation of the operation terminal 350. The management server 100 may implement a part or the entirety of the function and operation of the store server 300. The store server 300 may implement a part or the entirety of the function and operation of the management server 100. The management server 100 may implement a part or the entirety of the function and operation of the bank server 500. The bank server 500 may implement a part or the entirety of the function and operation of the management server 100. Distributed or integrated forms of each device are not limited to the forms described above, and all or some of the forms may be distributed or integrated functionally or physically in any unit depending on various loads, use statuses, or the like.

A cash depositing system according to the present disclosure is a system for a user to deposit cash into an account of the user via a store. The system includes: a cash handling apparatus configured to recognize and count cash that the user has deposited at the store, and obtain an amount of the cash; and a management server configured to acquire the amount of the cash and account information of the user, and determine whether or not a fund equivalent to an account deposit amount, which is an amount to be deposited into the account of the user, can be obtained from the store and moved to a management company. Based on a determination result that the fund can be obtained from the store to the management company, the management server instructs an external device, which performs account handling for moving the fund from an account of the management company to an account of the user, to perform the account handling.

In the above configuration, the management server may instruct an external device, which performs account handling for moving the fund equivalent to the account deposit amount from an account of the store to the account of the management company, to perform the account handling. The management server may obtain the determination result that the management company can obtain the fund from the store, based on that the external device can perform the account handling for moving the fund from the store to the management company.

In the above configuration, the management server may subtract the account deposit amount from a store deposit that the management company has received in advance from the store. The management server may obtain the determination result that the management company can obtain the fund from the store, based on that a balance of the store deposit does not turn negative after subtracting the account deposit amount from the store deposit.

In the above configuration, the management server may manage account deposit amounts, which have been obtained by receiving cash into a plurality of cash handling apparatuses from users, in association with the accounts of the respective users. The management server may calculate a total amount of a plurality of account deposit amounts associated with the same account, and may make an instruction of account handling for moving a fund equivalent to the total amount to collectively handling the plurality of account deposit amounts.

In the above configuration, the cash handling apparatus may receive the account information from a terminal device possessed by the user, and the management server may acquire the account information from the cash handling apparatus.

In the above configuration, the account information may include information on the account of the user, and information on date and time at which the fund equivalent to the account deposit amount is to be moved from the account of the management company to the account of the user.

In the above configuration, the external device may be a financial institution server, and the financial institution server may deposit, into the account of the management company, a commission according to the amount of the fund moved from the account of the management company to the account of the user.

In the above configuration, the cash handling apparatus may be a checkout machine used for checkout of transactions performed between a customer and the store, or a money changer by which the customer changes denomination of cash to different denominations.

In the above configuration, the account deposit amount may be an amount obtained by subtracting a handling fee to be paid by the user to the store, from the amount of the cash that the user has deposited at the store.

A cash depositing method according to the present disclosure is a method for a user to deposit cash into an account of the user via a store. The method includes: causing a cash handling apparatus to recognize and count cash that the user has deposited at the store, and obtain an amount of the cash; causing a management server to acquire the amount of the cash, and account information of the user; causing the management server to determine whether or not a fund equivalent to an account deposit amount, which is an amount to be deposited into the account of the user, can be obtained from the store and moved to a management company; and causing the management server, based on a determination result that the fund can be obtained from the store to the management company, to instruct an external device, which performs account handling for moving the fund from an account of the management company to the account of the user specified based on the account information, to perform the account handling.

As described above, the user of the cash depositing system according to the present embodiment can deposit cash into his/her bank account by depositing cash at a store and paying a handling fee to the store, without using an ATM. The store can obtain the handling fee by receiving in trust the cash from the user. In addition, the store can use the cash that the store has received in trust from the user, as change in item transactions. The bank can provide the user with a cash depositing service without installing an ATM in the store. The bank can easily and inexpensively increase locations where the cash depositing service is provided, as compared to the case of installing ATMs.

As described above, the cash depositing system and the cash depositing method according to the present disclosure are useful when the user deposits cash into an account at a financial institution, in a retail store.

What is claimed is:

1. A cash depositing system for a user to deposit cash into an account of the user via a store, the cash depositing system comprising:
    a cash handling apparatus configured to recognize and count cash that the user has deposited at the store, and obtain an amount of the cash; and
    a management server configured to:
        acquire the amount of the cash and account information of the user;
        determine whether a fund which is equivalent to an account deposit amount can be obtained from the store and moved to a management company, the account deposit amount being an amount to be deposited into the account of the user; and
        based on a determination result indicating that the fund can be obtained from the store to the management company, instruct an external device, which performs account handling for moving the fund from an account of the management company to an account of the user, to perform the account handling, wherein
    the management server determines whether the fund can be obtained based on whether the external device is capable of performing the account handling for moving the fund from the store to the management company.

2. The cash depositing system according to claim 1, wherein
    the management server subtracts the account deposit amount from a store deposit that the management company has received in advance from the store, and
    the management server obtains the determination result indicating that the management company can obtain the fund from the store based on a balance of the store deposit not turning negative after subtracting the account deposit amount from the store deposit.

3. The cash depositing system according to claim 1, wherein the management server is further configured to:
    manage account deposit amounts, which have been obtained by receiving cash into a plurality of cash handling apparatuses from users, in association with the accounts of the respective users;
    calculate a total amount of a plurality of account deposit amounts associated with the same account; and
    initiate an instruction of account handling for moving a fund equivalent to the total amount to collectively handling the plurality of account deposit amounts.

4. The cash depositing system according to claim 1, wherein
    the cash handling apparatus receives the account information from a terminal device possessed by the user, and
    the management server acquires the account information from the cash handling apparatus.

5. The cash depositing system according to claim 1, wherein the account information includes information on the account of the user, and information on date and time at which the fund equivalent to the account deposit amount is to be moved from the account of the management company to the account of the user.

6. The cash depositing system according to claim 1, wherein
    the external device is a financial institution server, and
    the financial institution server deposits, into the account of the management company, a commission according to the amount of the fund moved from the account of the management company to the account of the user.

7. The cash depositing system according to claim 1, wherein the cash handling apparatus is a checkout machine used for checkout of transactions performed between a customer and the store, or a money changer by which the customer changes denomination of cash to different denominations.

8. The cash depositing system according to claim 1, wherein the account deposit amount is obtained by subtracting a handling fee to be paid by the user to the store, from the amount of the cash that the user has deposited at the store.

9. A cash depositing method for a user to deposit cash into an account of the user via a store, the method comprising:
    controlling a cash handling apparatus to recognize and count cash that the user has deposited at the store, and to obtain an amount of the cash;

acquiring, by a management server, the amount of the cash and account information of the user;

determining, by the management servers, whether a fund which is equivalent to an account deposit amount can be obtained from the store and moved to a management company, the account deposit amount being an amount to be deposited into the account of the user; and instructing, by the management server and based on a determination result indicating that the fund can be obtained from the store to the management company, an external device, which performs account handling for moving the fund from an account of the management company to the account of the user specified based on the account information, to perform the account handling, wherein the determining whether the fund can be obtained is based on whether the external device is capable of performing the account handling for moving the fund from the store to the management company.

10. The cash depositing method according to claim 9, wherein the account deposit amount is obtained by subtracting a handling fee to be paid by the user to the store, from the amount of the cash that the user has deposited at the store.

11. A cash depositing system for a user to deposit cash into an account of the user via a store, the cash depositing system comprising:

a cash handling apparatus configured to recognize and count cash that the user has deposited at the store, and obtain an amount of the cash; and a management server configured to:
acquire the amount of the cash and account information of the user;

determine whether a fund which is equivalent to an account deposit amount can be obtained from the store and moved to a management company, the account deposit amount being an amount to be deposited into the account of the user;

based on a determination result indicating that the fund can be obtained from the store to the management company, instruct an external device, which performs account handling for moving the fund from an account of the management company to an account of the user, to perform the account handling;

manage account deposit amounts, which have been obtained by receiving cash into a plurality of cash handling apparatuses from users, in association with the accounts of the respective users;

calculate a total amount of a plurality of account deposit amounts associated with the same account; and initiate an instruction of account handling for moving a fund equivalent to the total amount to collectively handling the plurality of account deposit amounts.

* * * * *